Sept. 14, 1965
B. D. WAHL
3,206,009
ROLL ASSEMBLY WITH COMBINED PINCH AND TENSION
ADJUSTING ROLL
Filed April 22, 1963
2 Sheets-Sheet 1
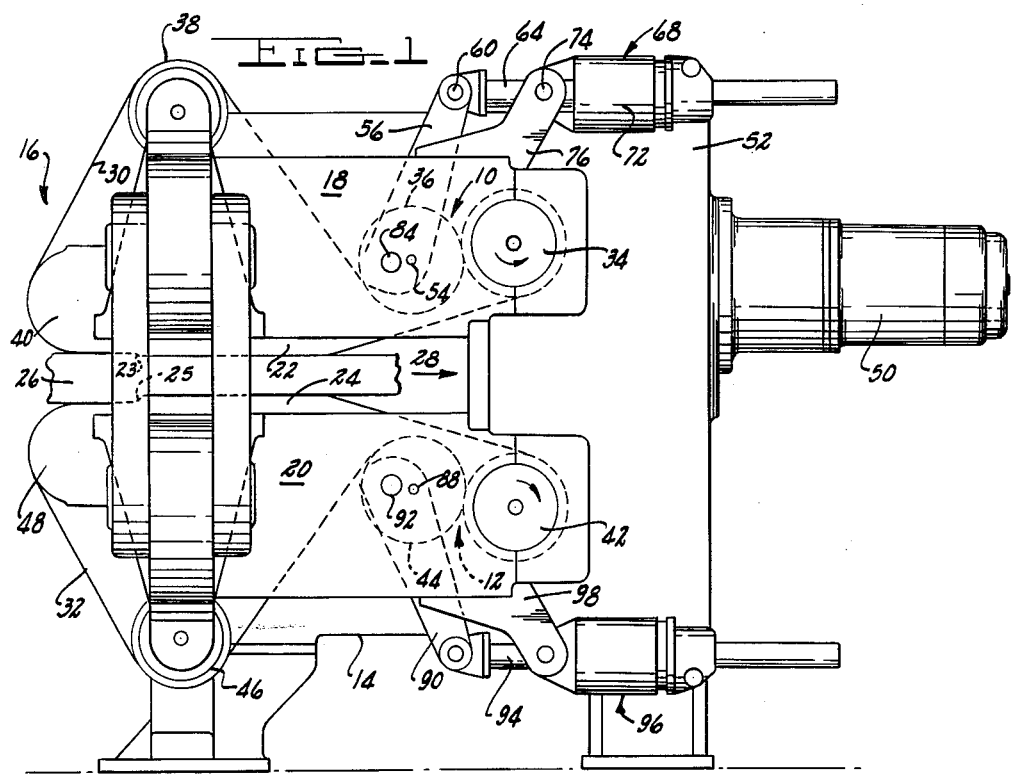
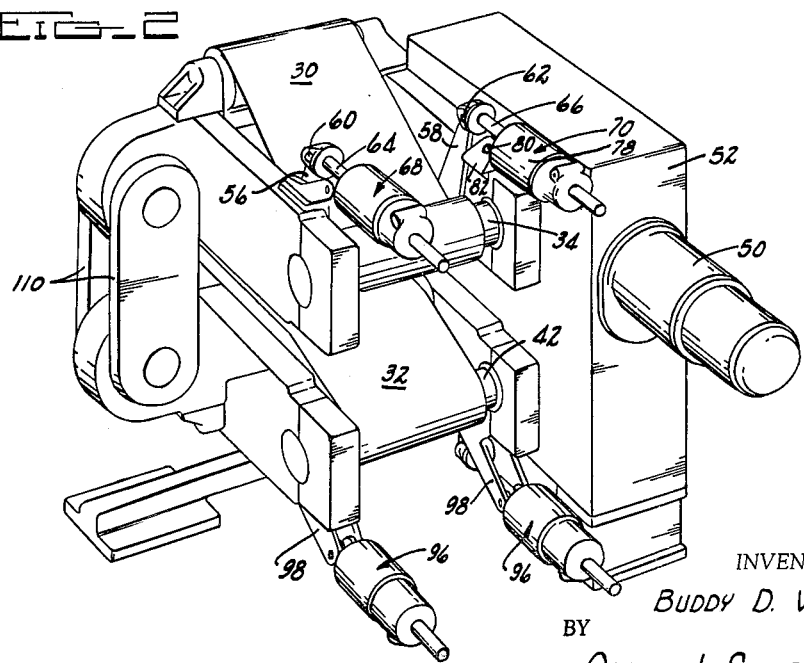
INVENTOR.
BUDDY D. WAHL
BY
OLSEN & STEPHENSON
ATTORNEYS

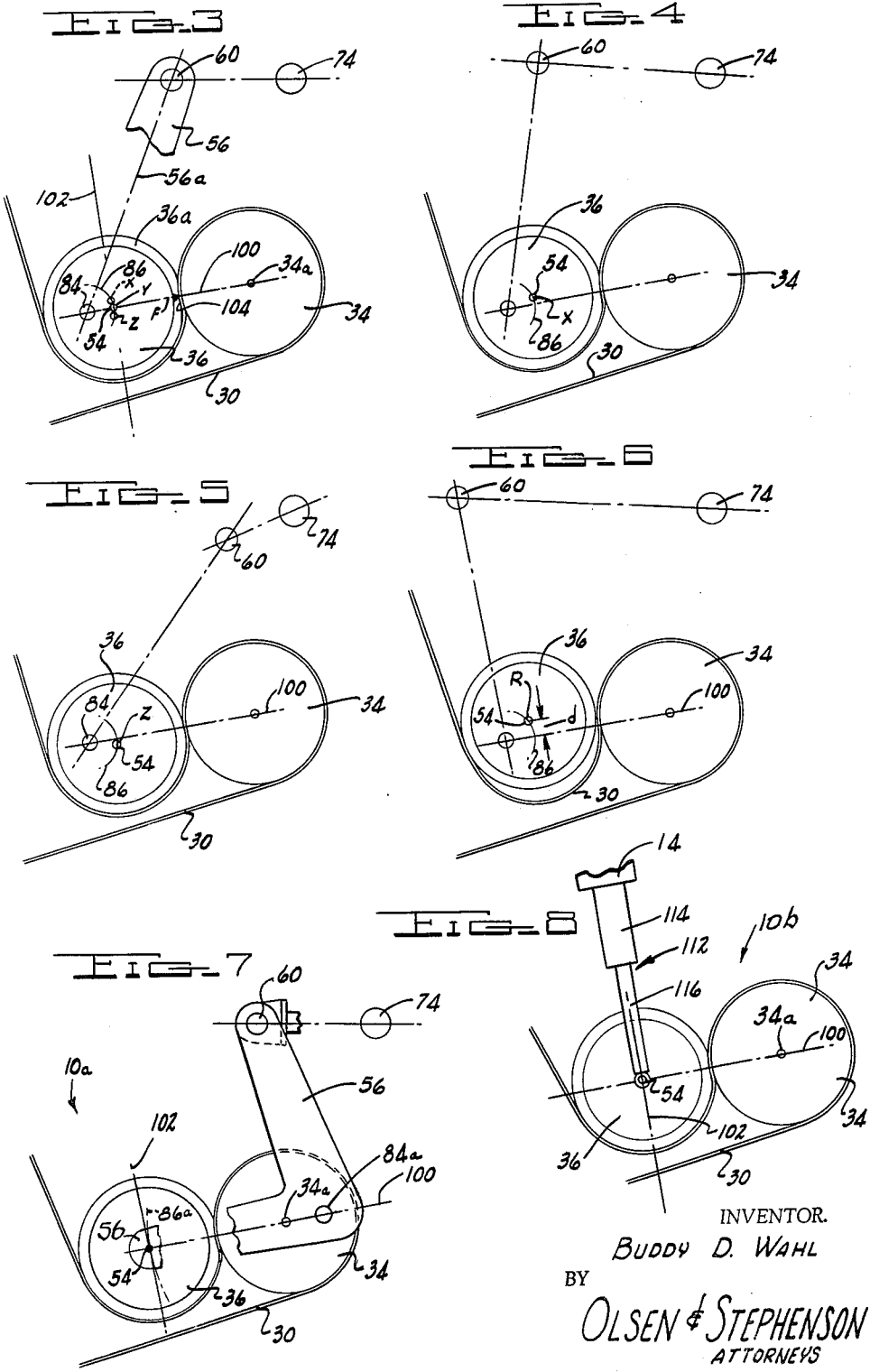

United States Patent Office
3,206,009
Patented Sept. 14, 1965

3,206,009
ROLL ASSEMBLY WITH COMBINED PINCH
AND TENSION ADJUSTING ROLL
Buddy D. Wahl, Toledo, Ohio, assignor to Hoover Ball
and Bearing Company, Saline, Mich., a corporation of
Michigan
Filed Apr. 22, 1963, Ser. No. 274,602
9 Claims. (Cl. 198—208)

This invention relates generally to continuous molding machines for forming workpieces, such as laminated plastic surface boards, case hardened wood boards, and similar articles, and more particularly to an improved roll assembly for supporting a traveling belt in a machine of this or similar type.

In a continuous molding machine of the above type, disclosed in copending application Serial No. 70,498 filed November 21, 1960, now Patent No. 3,159,526, owned by the assignee of this application, a pair of endless sheet metal belts are arranged so that workpieces supported by the belts are pulled through two opposed or inwardly facing shoes or platens which apply pressure and heat to the workpieces. The endless traveling belts slide over the platen surfaces so that the workpiece, arranged between the belts, is compressed between the platens. A roll assembly, which includes a drive roll is mounted on the main frame of the machine for supporting each of the belts for travel along an endless path. By virtue of the fact that the workpiece is compressed, large driving forces must be applied by the roll assemblies to the belts in order to efficiently move the workpieces through the restricted area between the platens. It is an object of this invention, therefore, to provide a belt supporting roll assembly, for use in continuous molding and similar machines, which is operable to apply large driving forces to the endless belt supported thereon, and which in addition is operable to adjust the tension in the belt, adjust the path of travel of the belt for alignment purposes and which is also adjustable to release tension in the belt so that it can be removed from the machine.

A further object of this invention is to provide a belt supporting roll assembly which includes a combined pinch and belt tension adjustment roll which functions to pinch the belt against the drive roll so as to increase the net driving force applied to the belt and which is also adjustable to align the belt and vary the belt tension without materially affecting the desired pinch action of the roll.

Still a further object of this invention is to provide a roll assembly which includes a drive roll and an adjacent pinch roll which has its surface portion constructed of a more resilient material than the drive roll so that adjustment of the pinch roll for belt tension purposes does not adversely affect the pinch action of the roll and so that sharp bends in the belt might cause fatigue failure of the belt are avoided.

Further objects, features and advantages of this invention will become apparent from a consideration of the following description, the appended claims, and the accompanying drawing in which:

FIGURE 1 is a side elevational view of a continuous molding machine provided with a pair of belt supporting roll assemblies of this invention;

FIGURE 2 is a perspective view of the machine shown in FIG. 1;

FIGURE 3 is a diagrammatic view of a portion of a roll assembly of this invention, showing the relative positions of the drive and pinch rolls in one position of the pinch roll and showing the arc traveled by the pinch roll axis on adjustment of the position of the pinch roll;

FIGURE 4 is a diagrammatic view showing the pinch and drive rolls in the roll assembly of this invention in one adjusted pinch position of the pinch roll;

FIGURE 5 is a diagrammatic view showing the pinch and drive rolls in the roll assembly of this invention in another adjusted pinch position of the pinch roll;

FIGURE 6 is a diagrammatic view showing the pinch and drive rolls in the roll assembly of this invention in a belt release position of the pinch roll;

FIGURE 7 is a diagrammatic view, like FIG. 3, illustrating a modified form of the roll assembly of this invention; and FIGURE 8 is a diagrammatic view, like FIG. 3, illustrating another modified form of the roll assembly of this invention.

With reference to the drawing, a pair of roll assemblies of this invention, indicated generally at 10 and 12, are shown in FIG. 1 mounted on the main frame 14 of a continuous molding machine, indicated generally at 16, of the type described in copending application Serial No. 70,498. The main frame 14 has upper and lower portions 18 and 20, respectively, between which are mounted opposed shoes or platens 22 and 24. A workpiece, indicated generally at 26, is passed between the shoes 22 and 24 in the direction of the arrow 28 so that the workpiece is fused between the shoes 22 and 24, in a manner described in detail in the above copending application. A pair of sheet metal belts 30 and 32 are mounted on the roll assemblies 10 and 12, respectively, so that they are drawn over the shoes 22 and 24 for moving the workpiece 26 in the direction of the arrow 28. The platens 22 and 24 are formed with steps 23 and 25, respectively, which extend toward each other so as to reduce the distance between the platens 22 and 24 as the workpiece 26 progresses therebetween. As a result, surface portions of the workpiece 26 are compressed and the driving forces required of the belts 30 and 32 to efficiently move the workpiece 26 are substantial.

The upper roll assembly 10 includes a drive roll 34, a combination pinch and belt adjustment roll 36, hereinafter referred to as the "pinch roll" and an idler roll 38. The belt 30 is also trained over a bull nose section 40 on the front end of the platen 22. The lower roll assembly 12 likewise includes a drive roll 42, a combination pinch and belt adjustment roll 44, hereinafter referred to as a "pinch roll" and an idler roll 46. The lower belt 32 is also trained over a bull nose section 48 on the front end of the platen 24. A motor 50 (FIGS. 1 and 2) is mounted on the main frame 14 so that it drives a drive gear assembly (not shown) disposed in a gear box 52 and connected to the drive rolls 34 and 42 so as to drive them in the direction of the indicating arrows shown in FIG. 1.

The upper pinch roll 36 is mounted at its ends on stub shafts 54, only one of which is shown, carried by a pair of adjusting arms 56 and 58 which are supported at their upper ends on pivot pins 60 and 62 carried by the piston rods 64 and 66 in a pair of fluid operated cylinder assemblies 68 and 70, respectively. The cylinder assembly 68 has its cylinder 72 pivotally supported on a pivot pin 74 carried by a bracket 76 secured to the upper main frame portion 18. The cylinder 78 in the cylinder assembly 70 is supported on a pivot pin 80 which is substantially coaxial with the pin 74 and is carried by a bracket 82 mounted on the upper main frame portion 18 at a position in substantial alignment with the bracket 76. Adjacent its lower end, the arm 56 is pivotally connected to the main frame portion 18 by a pivot member 84, and the arm 58 is similarly connected to the main frame portion 18 by a pivot which is substantially coaxial with pivot 84 and which does not appear in the drawing.

It can thus be seen that when the cylinder assembly 68 is actuated to move the piston rod 64, the arm 56 is rocked about the pivot 84 so as to move the stub shaft 54 with the pinch roll 36 thereon along an arcuate path indicated generally at 86 in FIG. 3. The arm 58 is similarly movable, in response to actuation of the cylinder assembly 70, to move the stub shaft at the opposite end of the roll 36 along a similar path.

As best appears in FIG. 1, the roll assembly 12 is essentially an upside down version of the assembly 10, and the pinch roll 44 in the assembly 12 is adjusted in an identical manner to the adjustment of the pinch roll 36 in the upper assembly 10. For this purpose the pinch roll 44 is mounted at its ends on stub shafts 88, only one of which is shown, carried by a pair of arms 90, only one of which is shown, each of which is pivotally mounted on the lower portion 20 of the main frame 14 on a pivot member 92. Each arm 90 is pivotally connected at its lower end to one end of a piston rod 94 in a fluid actuated cylinder assembly 96 which has its cylinder pivotally mounted on a bracket 98 secured to the main frame lower portion 20.

In the use of the roll assemblies 10 and 12 in the operation of the machine 16, the upper cylinder assemblies 68 and 70 are operated to align the belt 30 and adjust the tension in the belt 30 to obtain the desired tightness of the belt on the assembly 10, and the lower cylinder assemblies 96 are similarly adjusted to align and obtain the desired tightness in the lower belt 32. Since the roll assemblies 10 and 12 operate in an identical manner to achieve the objectives of this invention, only the operation of the upper assembly 10 will be hereinafter described in detail.

In the following description it is assumed that the belt 30 is shaped so that its opposite edges are of exactly equal lengths, and the upper rolls 34 and 38 and the surface of the bull nose 40 are exactly parallel so that no adjustment of the pinch roll 36 to compensate for belt length and misalignment of rolls is necessary, and that therefore the stub shafts 54 are in horizontal coaxial alignment and are maintained in alignment and in a parallel relation with the axis of the drive roll 34 in each of the hereinafter described positions of the roll 36.

The maximum pinch effect of the roll 36 is obtained when it is in a position in which its supporting shafts 54 are positioned in an imaginary plane 100 (FIG. 3) which extends between the arm pivots 84 and the axis of the drive roll 34. This position of the pinch roll 36 is illustrated in FIG. 3, in which the longitudinal axis of arm 56 is indicated at 56a and the drive roll axis is shown at 34a and, for convenience of description this position is hereinafter referred to as the "Y" position of the roll 36.

The drive roll 34 is either formed entirely of a hard rubber material or has a cover or surface portion formed of this or a similar high friction hard material. The pinch roll 36 is provided with a cover 36a of a rubber or similar material which is softer or more resilient than the material in the surface of the roll 34 by a degree such that substantially all of the deformation which takes place when the rolls 34 and 36 are moved against opposite sides of belt 30, takes place in the softer pinch roll 36. This deformation is illustrated in FIG. 3 which shows that the side 104 of the pinch roll 36, which has the belt pinched between the roll 36 and the drive roll 34, is substantially deformed inwardly.

The roll 36 is formed of this softer or more resilient material for two reasons. First of all, it enables adjustment of the position of the pinch roll 36 with respect to the drive roll 34 without materially affecting the "pinch effect" of the roll 36 on the belt 30 as it passes between the rolls 34 and 36. Secondly, as the belt 30 emerges from between the rolls 34 and 36, the roll 36 deforms sufficiently to provide a smooth curve in the belt 30, without any sharp bends in the belt which would tend to cause fatigue failure in the belt.

The presence of the pinch roll 36 increases the net driving force which the drive roll 34 can exert on the belt 30, over the force which the drive roll 34 would be capable of exerting if the roll 36 did not pinch the belt 30 against the roll 34, by an amount expressed by the following equation:

Net driving force increase = $FfE^{\theta f}$ in which:

F is the total force exerted on the belt 30 as it passes between the rolls 34 and 36 by the pinch roll 36.

$f$ is the coefficient of friction between the belt 30 and the drive roll 34.

E is the base of the natural systems of logarithms, and $\theta$ is the angle of wrap of the belt 30 about the drive roll 34.

Since all of the factors in the above equation are constant in the roll assembly 10, except F, and a maximum F is obtained in the assembly 10 when the stub shafts 54 are disposed in the plane 100, the pinch roll 36 makes its largest contribution to the net driving force which the drive roll 34 can exert in the "Y" position of the pinch roll 36, shown in FIG. 3.

However, since a portion of the arc 86 closely approximates a portion of a straight line 102 which is perpendicular to the plane 100, adjustment of the position of the roll 36 to locate the roll axis at another position on this portion of the arc 86 does not move the roll substantially relative to the roll 34. As a result, some adjustment of the position of the roll 36 to move the stub shafts 54 above or below the plane 100 is permissible without affecting the pinch effect on belt 30 of the pinch roll 36. However, for each increment of movement of the axis 54 of the roll 36 above the plane 100, the path of travel of the belt 30 is decreased by an amount twice this increment since the outer side of belt 30 is wrapped substantially half way around roll 36, in the illustrated embodiment of the invention. Likewise, for each increment of movement of the axis 54 below the plane 100, the path of movement of the belt 30 is lengthened by an amount equal to twice that increment. By "belt path" is meant the shortest distance around the rolls 34, 36 and 38, the bull nose 40 and the platen 22. As a result, the position of the roll 36 may be readily adjusted to adjust the tension in the belt 30 sufficiently to obtain the desired belt tightness, without materially affecting the pinch effect of the roll 36 on the belt 30.

In FIG. 4 an adjusted position of the pinch roll 36 is shown in which the roll axis 54 is moved above the plane 100. This position of the roll 36 is hereinafter referred to as the "X" position and as shown in FIG. 4 the position of the pinch roll 36 with respect to the drive roll 34 is not changed enough to materially effect the pinch action of the roll 36 on the belt 30, since the pinch roll axis is moving substantially along line 102.

In FIG. 5, an adjusted position of the roll 36 is shown in which the roll axis 54 is moved along the arc 86 to a position below the plane 100 to increase belt tightness. This position of the pinch roll is hereinafter referred to as the "Z" position, and as shown in FIG. 5, the roll 36 has not been moved sufficiently with respect to the roll 34 to adversely affect the advantageous characteristics of the pinch action of the roll 36 on the belt 30. The "X" and "Z" positions are shown in broken lines in FIG. 3 with respect to the "Y" position and as shown in FIG. 3 the portion of arc 86 between the "X" and "Z" positions is substantially flat and lies substantially on the line 102 perpendicular to plane 100.

In the event it is desired to remove the belt 30 from the roll assembly 10, the belt must be loosened and this is accomplished by actuating the cylinder assemblies 68 and 70 to move the pinch roll stub shafts 54 upwardly along the arcuate path 86 a distance sufficient to move the roll 36 to a position spaced from the drive roll 34. This position of the pinch roll 36, herein referred to as the "R" or release position is shown in FIG. 6. The stub shafts have been moved upwardly a distance "d" perpendicular to plane 100 resulting in shortening the belt path by a distance "2d," thereby eliminating all the pinch effect. This allows the lifting out of pinch roll 36. The machine main frame 14 has pivoted links 110 (FIG. 2)

which connect the upper and lower frame portions 16 and 18, and which swing free to allow removal of the belts 30 and 32 after the pinch rolls are out.

In the event of belt misalignment, one of the cylinder assemblies 68 and 70 is actuated to move one shaft 54 up or down relative to the other shaft 54 to thus incline the axis of the pinch roll 34 slightly to compensate for and correct the misalignment. During subsequent adjustments of the position of the pinch roll 36 to adjust tension in the belt 30, the cylinder assemblies 68 and 70 are actuated so as to maintain this inclination of the pinch roll 36. Since, as previously described, the pinch roll 36 may be adjusted limited vertical distances without adversely affecting its pinch action on belt 30, the slight inclination of the pinch roll 36 does not materially affect its pinch function.

In FIG. 7 a modified form 10a of the roll assembly of this invention is illustrated which is identical in all respects to the roll assembly 10 except that each of the roll supporting arms 56 and 58 is of a generally "bell-crank" shape and is mounted intermediate its ends on a pivot member 84a, carried by the main frame upper portion 18, which is located on the drive roll side of the line 102. Thus, on pivotal movement of the arms 56 and 58 about the pivots 84a, the pinch roll stub shafts 54 are movable along an arc 86a which likewise substantially coincides, over a portion of its length, with the line 102. The pivot members 84a are located to one side of the space between the roll axes 34a and 54 and in the plane 100, so that a maximum pinch effect is obtained when the pinch roll axis 54 is in the plane 100 as shown in FIG. 7. Consequently, in the modified pinch and drive roll assembly shown in FIG. 7, the pinch roll 36 is also adjustable, between positions corresponding to the "X," "Y," "Z" and "R" positions explained above, to adjust belt tension while still obtaining the desired pinch action of the roll 36.

In FIG. 8 another modified form 10b of the roll assembly of this invention is shown which is identical in all respects to the roll assembly 10, except that each of the roll supporting arms 56 and 58 is replaced with an extensible and retractible supporting arm 112. The arm 112 may conveniently take the form of a fluid actuated cylinder assembly having a cylinder 114 attached at its upper end to the main frame 14 and having a piston rod 116 attached at its lower end to a pinch roll stub shaft 54. The stub shafts 54 are held in longitudinal slots (not shown) formed in the main frame 14 so that they are parallel to line 102. The side of the slot away from the drive roll 34 provides the back-up force for the pinch effect. Each arm 112 has its longitudinal axis positioned on a line 102 perpendicular to the plane 100, so that on extension and retraction of each arm 112 the supported stub shaft 54 is movable between positions corresponding substantially to the "X," "Y," "Z" and "R" positions explained above. It can thus be seen that in the assembly 10b, the pinch roll 36 can be adjusted to adjust belt tension while still obtaining the pinch action of the roll 36. In addition the arms 112 can be actuated to move roll 36 to a belt release position spaced from drive roll 34 to facilitate removal of belt 30.

It will be understood that the roll assembly with combined pinch and tension adjusting roll which is herein disclosed and described is presented for purposes of explanation and illustration and is not intended to indicate limits of the invention, the scope of which is defined by the following claims.

What is claimed is:

1. An endless belt, means including a drive roll supporting said belt for travel along an endless path, said drive roll being operable to drive said belt along said path, said drive roll being in direct engagement with one side of said belt and having said belt wrapped partially thereabout, a pinch roll having said belt wrapped partially thereabout and positioned in direct engagement with the opposite side of said belt at a position in close proximity to said drive roll to pinch said belt directly between said pinch and drive rolls, and means supporting said pinch roll for adjustable movement between a plurality of belt pinch positions to adjust the length of said endless path.

2. An endless belt, means including a drive roll supporting said belt for travel along an endless path, said drive roll being operable to drive said belt along said path, said drive roll being in direct engagement with one side of said belt and having said belt wrapped partially thereabout, a pinch roll having said belt wrapped partially thereabout and positioned in direct engagement with the opposite side of said belt at a position in close proximity to said drive roll to pinch said belt directly between said pinch and drive rolls, said pinch roll having the surface thereof formed of a material which is more yieldable than the surface material of said drive roll so that said pinch roll is deformed by the pressure of said belt thereon, and means supporting said pinch roll for adjustable movement between a plurality of belt pinch positions to adjust the length of said endless path.

3. An endless belt having a pair of edges, a frame, means including a drive roll on said frame supporting said belt for travel along an endless path, said drive roll being operable to drive said belt along said path, said drive roll being in direct engagement with one side of said belt having said belt wrapped partially therabout, a pinch roll having said belt wrapped partially thereabout and positioned in direct engagement with the opposite side of said belt at a position in close proximity to said drive roll to pinch said belt directly between said pinch and drive rolls, a pair of support members on said main frame rotatably supporting opposite ends of said pinch roll, and means on said main frame for independently moving said support members for moving the pinch roll between a plurality of belt pinch positions to adjust the length of said endless path and independently adjust the lengths of the paths travelled by said belt edges.

4. An endless belt, means including a drive roll supporting said belt for travel along an endless path, said drive roll being operable to drive said belt along said path, said drive roll being in direct engagement with one side of said belt and having said belt wrapped partially thereabout so that engagement of said belt with said drive roll commences at one point on the periphery of said drive roll and terminates at a second point spaced from said one point, a pinch roll positioned in close proximity to said drive roll so as to cooperate with said drive roll to apply a pinching force to said belt at one of said points, said pinch roll having the opposite side of said belt wrapped partially thereabout and extending from said pinch point to a point on the periphery of said pinch roll spaced from said pinch point, and means supporting said pinch roll for movement along a path substantially perpendicular to a plane extending through the axes of rotation of said rolls between a plurality of positions in each of which said pinch and drive rolls cooperate to pinch said belt therebetween, said pinch roll in each of said pinch positions providing a different length to said endless path, thereby providing for adjustment of the tension in said belt.

5. An endless belt, means including a drive roll supporting said belt for travel along an endless path, said drive roll having an axis and being operable to drive said belt along said path, said drive roll being in direct engagement with one side of said belt and having said belt wrapped partially thereabout so that engagement of said belt with said drive roll commences at one point on the periphery of said drive roll and terminates at a second point spaced from said one point, a pinch roll positioned in close proximity to said drive roll so as to cooperate with said drive roll to apply a pinching force to said belt at one of said points, said pinch roll having an axis and having the opposite side of said belt wrapped partially thereabout and extending from said pinch point to a point on the periphery of said pinch roll spaced from said pinch point, and means pivotally supporting said pinch roll for pivotal movement about a pivot axis located to one side of the axis of said pinch roll so that said pinch roll axis is movable along an arcuate path a portion of which is at substantially a right angle to a plane extending through said drive roll axis and said pivot axis, said pinch roll being movable between a plurality of positions in which the axis thereof is disposed on said arcuate path portion and in each of which positions said pinch and drive rolls cooperate to pinch said belt therebetween, said pinch roll in each of said pinch positions providing a different length to said endless path, thereby providing for adjustment of the tension in said belt.

6. The combination according to claim 5 in which said pinch roll is also movable along said arcuate path to a belt release position in which said pinch roll is positioned relative to said drive roll such that said pinch roll exerts substantially no pressure on the portion of said belt between said rolls.

7. The combination according to claim 5 in which said pinch roll axis is located between said pivot axis and said drive roll axis.

8. The combination according to claim 5 in which said drive roll axis is located between said pivot axis and said pinch roll axis.

9. An endless belt, means including a drive roll supporting said belt for travel along an endless path, said drive roll being operable to drive said belt along said path, said drive roll being in direct engagement with one side of said belt and having said belt wrapped partially thereabout so that engagement of said belt with said drive roll commences at one point on the periphery of said drive roll and terminates at a second point spaced from said one point, a pinch roll positioned in close proximity to said drive roll so as to cooperate with said drive roll to apply a pinching force to said belt at one of said points, said pinch roll having the opposite side of said belt wrapped partially thereabout and extending from said pinch point to a point on the periphery of said pinch roll spaced from said pinch point, and extensible means supporting said pinch roll for movement along a path perpendicular to a plane extending through the axes of rotation of said rolls between a plurality of positions in each of which said pinch and drive rolls cooperate to pinch said belt therebetween, said pinch roll in each of said pinch positions providing a different length to said endless path, thereby providing for adjustment of the tension in said belt.

References Cited by the Examiner
UNITED STATES PATENTS

| | | | |
|---|---|---|---|
| 986,162 | 5/11 | Gare. | |
| 1,308,111 | 7/19 | Porzel | 18—6 |
| 1,948,491 | 2/34 | Brockway | 18—6 |
| 2,093,922 | 9/37 | Meyer | 18—6 |
| 2,159,543 | 5/39 | Baker | 18—6 |
| 2,442,443 | 6/48 | Swallow | 18—6 |
| 2,528,168 | 10/50 | Paulsen | 18—6 XR |
| 2,663,052 | 12/53 | Goulding et al. | 18—6 |
| 2,745,134 | 5/56 | Collins | 18—6 XR |
| 2,971,218 | 2/61 | Bierer | 18—6 XR |

J. SPENCER OVERHOLSER, *Primary Examiner.*

WILLIAM J. STEPHENSON, *Examiner.*